May 15, 1945. R. SIMON 2,375,951
AIRCRAFT CONSTRUCTION
Filed March 21, 1942
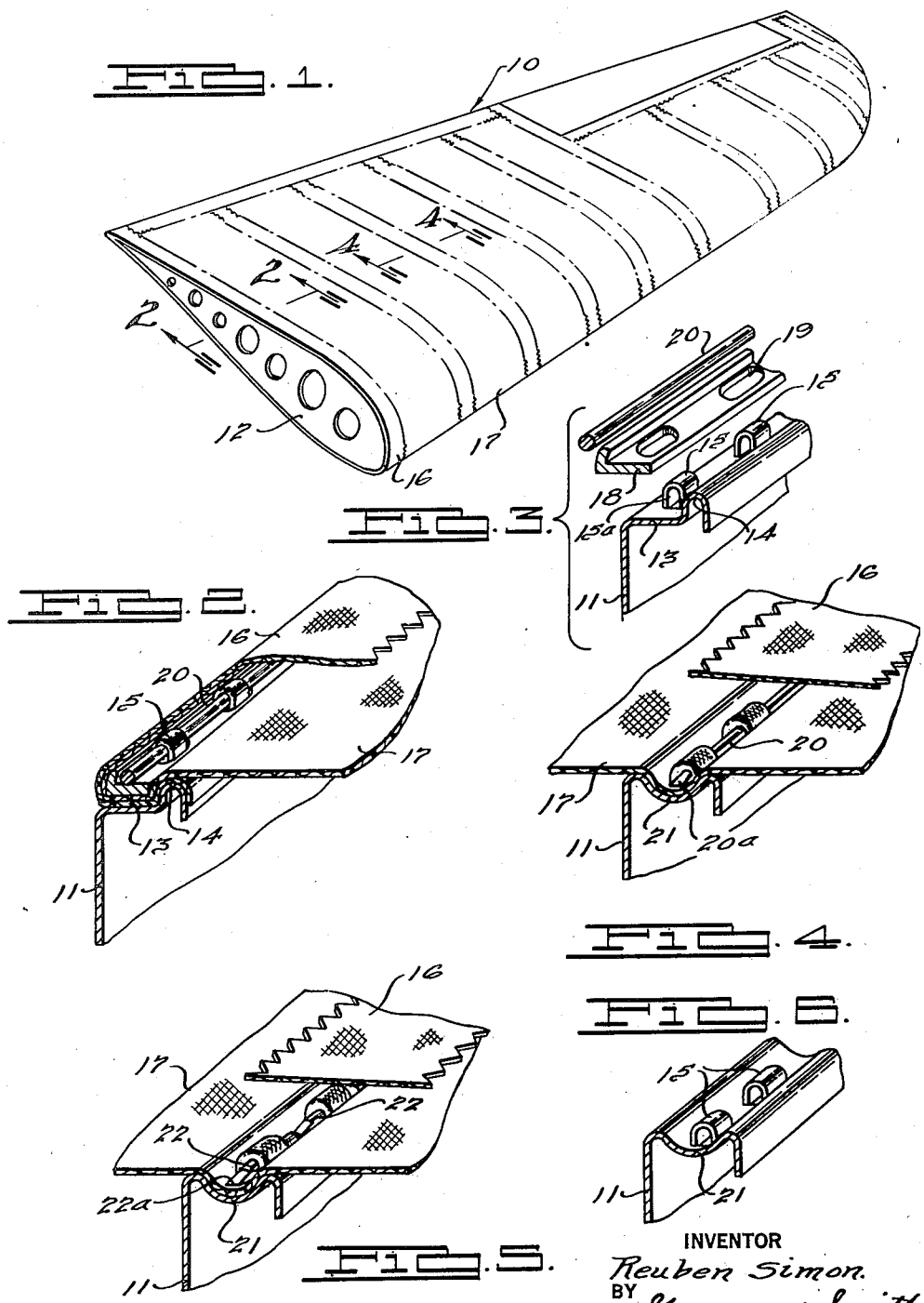
INVENTOR
Reuben Simon.
BY Gray and Smith
ATTORNEYS.

Patented May 15, 1945

2,375,951

UNITED STATES PATENT OFFICE 2,375,951

AIRCRAFT CONSTRUCTION

Reuben Simon, Detroit, Mich., assignor to Briggs Manufacturing Company, Detroit, Mich., a corporation of Michigan Application March 21, 1942, Serial No. 435,664

5 Claims. (Cl. 244—132)

This invention relates to aircraft and in particular is directed to the attachment of covering to airfoils and other skeleton structures.

It is the conventional practice in covering aircraft structure with elements such as cloth and metallic skin to attach the elements by sewing, riveting, bolting, welding and by various other means. This practice has not been entirely satisfactory because of the roughness of the joint, the high cost of assembly and the difficulty and expense in making repairs and replacements.

It is recognized that the ideal method of cover installation upon aircraft should make possible the temporary opening of the covering all or in part, to provide ready access to the controls and mechanism contained within the airfoils and other structure and to facilitate the replacing of the same covering. The need for this important facility is evidenced by emergency needs to correct faulty controls and mechanism, to permit the required inspections at regular intervals, and to make these repairs and inspections with a minimum time loss and with the elimination of specialized crews of workers, the maintenance of which in the field is a serious handicap to the proper and speedy functioning of the Air Service, particularly in time of war.

The objectionable features of the conventional practice are obviated by the present invention wherein the covering is firmly attached to the framework and ribs in a simple and easy manner requiring no particular skill and in a manner which enables the cover to be quickly removed and replaced.

It is an object of the invention to provide means for smoothly attaching the covering or skin of an aircraft to its supporting structure to substantially eliminate projections extending above the plane of the general top or outer surface of the covering.

Another object of the invention is to provide a covering or skin holding means whereby the covering or skin may be quickly and easily secured to or removed from the structure which it covers.

Other objects of this invention will appear in the following description and appended claims, reference being had to the accompanying drawing forming a part of this specification wherein like reference characters designate corresponding parts in the several views.

Fig. 1 is a perspective view of an airfoil with a covering attached thereto by means of the present invention.

Fig. 2 is an enlarged perspective view in section taken through lines 2—2 of Fig. 1 looking in the direction of the arrows.

Fig. 3 is an exploded view in perspective and partly in section of the parts shown in Fig. 2

Fig. 4 is an enlarged view in perspective and partly in section taken through lines 4—4 of Fig. 1 looking in the direction of the arrows.

Fig. 5 is an enlarged view in perspective and partly in section similar to Fig. 4 showing a modification of the invention.

Fig. 6 is an enlarged perspective view partly in section showing one of the parts of the invention.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the construction shown in the drawing, the airfoil 10 or other structural frame is provided with cap strips 11 for its ribs 12. The cap strips 11 are here shown in the form of metal channels or angle bars, and are adapted to be secured to the tops of metal or wooden ribs. The invention may also be applied to the surfaces of the rib structure per se which in conventional aircraft may be easily modified so that independent cap strips may be eliminated, permitting the covering or skin to be applied directly to the ribs.

Fig. 2 shows the application of the invention to cap strips secured to an end rib or frame member. In this instance the cap strip 11, at its top and along its length is provided with an inturned flange 13 which terminates in a generally inverted U-shaped channel or rib 14. At intervals along its length upon the flange 13 the cap strip is lanced to form spaced members 15 having eyes or openings 15a.

A length of flightex tape of a proper width, stretched and pierced to receive the members 15, is temporarily secured to the upper surface of the cap strip 11 by any suitable method such as by gluing. The covering or skin 17 is stretched and temporarily secured over the face of the wing, the side edges thereof being pierced to lie above the flightex tape upon the surface of the U-shaped channel or rib 14 and the flange 13. Perforated retainer or stringer members 18, L-shaped in construction, and preferably formed of metal, having openings 19 of sufficient size to receive the members 15 are inserted over the covering or skin so that the eyes or openings 15a extend above the retainer member. Flexible retaining rods or strands 20 are then inserted or threaded through the openings 15a to lock the retainer member 18 in position and thus to hold the covering securely in place. The edges of the covering 17 and the flightex tape 16 are then stretched over the L-shaped retainer member and attached, preferably with a well known airplane "dope" to the outer surface of the covering, thus presenting a substantially smooth cambered surface of high aerodynamic efficiency.

The construction shown in Fig. 4 illustrates the manner in which the invention may be applied to the surfaces of the internally spaced ribs of the airfoil 10. As shown, the cap strip 11 is provided with a groove or U-shaped depression 21. Spaced at intervals along its length within the U-shaped depression the cap strip 11 is lanced to provide raised members 15 having eyes or openings 15a. The covering or skin 17 encloses and stretches tautly over the cap strip, contacting the opposite upper edges of the groove 21. The taut covering or skin may then be manually forced into the U-shaped depression stretching it still tauter. The flexible retaining rod or strand 20 is then forced or threaded through the eyes or openings 15a piercing the covering or skin, thus holding the covering or skin taut against the upper edges of the U-shaped cap strip.

To facilitate piercing of the covering or skin one end of the retaining rod or strand may be flattened to form the cutting edges 20a. A length of flightex tape of proper width is then attached with a well known airplane "dope" to the outer surface of the covering or skin over the depression, leaving all the outer faces of the airfoil or other structural frame of the airplane a substantially uninterrupted smooth flush surface.

In order to remove the fabric covering or skin 17 it is only necessary to loosen the flightex tape 16 with a suitable solvent, such as acetone, remove the same, and remove the retaining rods or strands 20 which can be easily and quickly withdrawn from the retaining eyes. The necessary corrections of controls and mechanism within the airfoil or frame structure may then be made and the same covering or skin easily and quickly replaced.

The construction shown in Fig. 5 illustrates a modified form of the invention in which short retaining rods or strands 22 having cutting edges 22a at one end may be substituted where desired for the continuous rod or strand 20 employed in the other embodiments.

In addition to the provision for an easy and simplified means of removing and replacing the same covering or skin upon the skeleton structure of an airplane, the invention eliminates the need for the use of bolts, nuts, washers, and lacing or cords and further makes possible the simultaneous attachment of the covering or skin to both faces of the airfoil at the same time. Not only, therefore, does the invention make possible the speedy repairs and inspection of controls and mechanism within the skeleton structure of aircraft, but by requiring fewer relatively complicated operations in construction the time required for production is materially lessened and the production rate of such structures is greatly increased.

I claim:

1. An aircraft structure having a pliable covering and supporting frame with a cap strip to which said pliable covering is secured, said cap strip having a flat depressed surface along its top edge with raised members spaced along its length within the depression, said members having aligned openings, and L-shaped stringer member having spaced openings therein to receive said raised members, said stringer member having a bottom flange fitting over said cap strip within said depression and over said covering and also having an upright edge flange about which said covering is adapted to be stretched to cover said stringer member, and a locking strand threaded through said aligned openings to secure the covering within the depression.

2. An aircraft structure having a perforated covering and supporting frame to which said covering is secured, said frame at its top edge having a flat depressed surface along its length and provided with projecting eye members housed entirely within said depression and formed from the metal of said edge, said eye members being adapted to project through the perforations in said covering, an L-shaped stringer member having spaced openings to receive said eye members, one flange of said stringer member and a side wall of said depression forming a channel into which said eye members project, said stringer member fitting over said frame and over said covering, and a locking rod threaded through said eye members above the other flange of the stringer member to secure the covering within the depression.

3. An aircraft structure having a covering and a supporting frame member to which said covering is secured, the upper edge of said frame member having a supporting surface for the covering terminating along one edge in a raised shoulder, a retainer strip overlying said surface to clamp the covering thereagainst and having an upright edge forming with said shoulder a channel, eye members extending from said surface through openings in the retainer strip, and a strand threaded through said eye members.

4. An aircraft structure having a pliable covering and a supporting frame provided with a cap strip to which said covering is secured, said cap strip having a flat surface at its top edge terminating in a raised rib, raised member struck up from the bottom of said surface at a distance from said rib and spaced along its length, said members having aligned openings, a stringer member having spaced openings therein to receive said raised members, said stringer member fitting over said cap strip and over said covering, and a strand threaded through said aligned openings above said stringer member to secure the covering upon the cap strip.

5. An aircraft structure having a pliable covering and a supporting frame to which said covering is secured, said frame at its top edge having a depression along its length terminating in a longitudinal upright rib and provided with spaced raised members formed from the metal at the bottom of said depression and disposed at a distance from said rib, said members having aligned openings, a stringer member having spaced openings to receive said raised members, said stringer member fitting over said frame and over said covering, and a locking strand threaded through said aligned openings above said stringer member to secure the covering within the depression.

REUBEN SIMON.